United States Patent [19]

Satake

[11] Patent Number: 4,572,666

[45] Date of Patent: Feb. 25, 1986

[54] APPARATUS FOR DETECTING CRACKED RICE GRAIN

[75] Inventor: Toshihiko Satake, Higashihiroshima, Japan

[73] Assignee: Satake Engineering Co., Ltd., Tokyo, Japan

[21] Appl. No.: 356,281

[22] Filed: Mar. 9, 1982

[30] Foreign Application Priority Data

Mar. 13, 1981 [JP] Japan .................................. 56-36809

[51] Int. Cl.$^4$ ........................ G01N 21/85; G01N 21/89

[52] U.S. Cl. .................................... 356/239; 209/588; 250/223 R

[58] Field of Search ............... 356/237, 239, 250, 432; 250/223 R, 562, 572; 209/576, 588

[56] References Cited

U.S. PATENT DOCUMENTS

| | | | |
|---|---|---|---|
| 3,197,647 | 7/1965 | Fraenkel | 250/225 |
| 3,356,853 | 12/1967 | Rottmann | 356/240 |
| 3,812,348 | 5/1974 | Lippke | 356/430 |
| 3,871,774 | 3/1975 | Murata | 356/239 X |
| 4,279,346 | 7/1981 | McClure et al. | 250/223 R X |

FOREIGN PATENT DOCUMENTS

| | | | |
|---|---|---|---|
| 382957 | 6/1973 | U.S.S.R. | 356/237 |

*Primary Examiner*—Vincent P. McGraw
*Attorney, Agent, or Firm*—Henry Sternberg; Bert J. Lewen

[57] ABSTRACT

An apparatus for detecting cracked rice grains. The apparatus has conveyor means by which the rice grains to be examined are moved in at least one row extending in the direction of movement, a light-transmitting window formed in the conveyor means and adapted to pass a coherent light beam of a width smaller than the diameter of the rice grain, a light source means adapted to apply the coherent light, light-receiving means including light-receiving elements adapted to detect the quantities of lights transmitted through the leading half part and trailing half part of the rice grain when the latter passes over the light-transmitting window, and a circuit means adapted to measure and compare the quantities of light received by the light-receiving means in comparison with predetermined reference threshold values.

9 Claims, 10 Drawing Figures

APPARATUS FOR DETECTING CRACKED RICE GRAIN

The present invention relates to an improvement in apparatus for detecting cracked rice grain, adapted to detect cracks in grains of rice such as unhulled rice, hulled rice, polished rice and so forth and to count the number of cracked grains or to calculate the ratio of the number of cracked grains to the total number of grains.

Hitherto, as an apparatus for examining rice grains for cracks, only such a primitive and inefficient system has been known as adapted to array rice grains on light-transmitting window of a porous plate while applying a light from the lower side of the porous plate so that the operator visually examines the pattern of the transmission of light to know the number of the cracked grains.

The apparatus of the present invention has been developed to achieve a fully automatic operation of the work for examining the rice grains by using electronic engineering techniques thereby to make it possible to accurately measure the number of cracked grains or the ratio of the cracked grains in quite a short period of time.

According to the invention, a coherent light beam of a diameter much smaller than that of the rice grain is applied to the rice grain, and the quantities of light transmitted through both longitudinal half portions of the rice grain are converted into potential difference by light-receiving elements, so that the presence of the cracked grain is detected from the potential difference.

According to one aspect of the invention, there is provided an apparatus for detecting cracked rice grains comprising: grain conveyor means adapted to convey the grains straight in at least one row in the direction of movement; light source means adapted to apply a coherent light beam to the rice grains through a light-transmitting window formed in the conveyor means; light receiving means including a pair of light-receiving elements adapted to receive the quantities of light transmitted through leading part and trailing part of each grain as the grain passes over the light-transmitting window; and a circuit means adapted to detect the difference between light quantities received by the light-receiving elements in comparison with a predetermined reference threshold value.

According to another aspect of the invention, there is provided an apparatus for detecting cracked rice grains wherein the conveyor means includes a plate member provided with the light-transmitting window for passing a coherent light beam of a diameter smaller than that of the rice grain.

According to still another aspect there is provided an apparatus for detecting cracked rice grains characterized by comprising an electric circuit adapted to measure and compare the quantities of light only when the rice grain is brought to a measuring position where the coherent light beam is applied.

According to a further aspect of the invention, there is provided an apparatus for detecting cracked rice grains wherein the circuit means includes a counter circuit adapted to calculate the number of the grains while excepting grains of light quantity less than a predetermined level as being upriped rice grains.

According to a still further aspect of the invention, there is provided an apparatus for detecting cracked rice grains wherein the circuit means includes a counter circuit adapted to calculate the number of the grains while excepting grains of light quantity higher than a predetermined level as being hulled rice grains.

According to a still further aspect of the invention, there is provided an apparatus for detecting cracked rice grains characterized by further comprising glass fibers having one end optically connected to the light-receiving elements and the other ends disposed in the vicinity of the light-transmitting.

According to a still further aspect of the invention, there is provided an apparatus for detecting cracked rice grains wherein a plurality of light transmitting windows are formed in an endless conveyor belt adapted to run through the measuring position to which the coherent light is applied.

By way of example only, certain illustrative embodiments of the invention will now be described with reference to the accompanying drawings in which:

FIG. 1 is a vertical sectional view of an apparatus in accordance with an embodiment of the invention;

FIGS. 2*a* to 2*c* are illustrations of shadow patterns of a rice grain;

Figure 1:
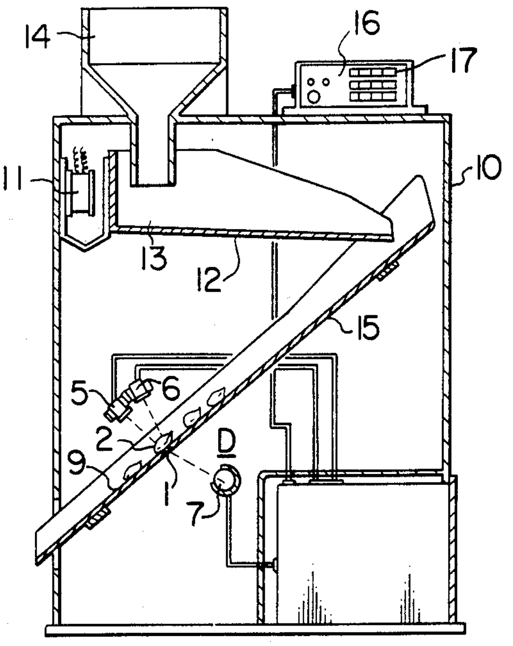

Referring first to FIG. 1 showing the whole portion of an apparatus in accordance with an embodiment of the invention, a reference numeral 10 denotes a box type frame at an upper portion of which mounted substantially horizontally or at a slight downward inclination is a grain supplying chute 12 provided with a vibrator 11. A grain supplying hopper 14 is mounted on the frame 10 to take a position just above the receiving portion 13 of the chute 12, while a flow-down conduit 15 is connected to the discharge side of the chute 12. The flow-down conduit 15 extends to the outside of the frame through an opening formed in the wall of the frame. A light transmitting window 1 is formed in a plate 9 laid on the bottom of the flow-down conduit 15. A light quantity detecting section generally designated at D includes a light source 7 and a pair of light-receiving elements 5 and 6 which are arranged at both sides of the plate 9 across the light transmitting window 1. The light source 7 consists of an incandescent lamp, laser transmitter or the like, while the light-receiving elements 5 and 6 are constituted by photodiodes or the like. The light-receiving elements 5 and 6 are operatively and electrically connected to a cracked grain detecting device 16 mounted on the frame 10. A reference numeral 17 denotes a display provided on the detecting device 16.

Various types of light source such as fluorescent lamp, laser oscillating tube and so forth, as well as the aforementioned incandescent lamp, can be used for producing the aforementioned coherent light beam. In the case where a light other than laser beam is used, however it is necessary to converge the light beam into coherent light by means of lenses, small light-transmitting slit or the like.

In operation, assuming here that the grains are unhulled rice grains, the unhulled rice grains 2 are supplied through the hopper 14, chute 12 and then flows down along the flow-down conduit 15. The grains then pass over the light-transmitting window 1. As each grain passes over the light-transmitting window 1, the coherent light beam from the light source 7 passes through the front portion 3 and the rear portion 4 of the grain. The quantities of light transmitted through these portions of the grain are received by the light-receiving elements 5 and 6, respectively. The difference between the quantities of light received by both light-receiving elements 5 and 6 is compared with a reference threshold value set in an electric circuit of the cracked grain detecting device 16, and the presence of the crack in the grain is known from the result of this comparison. Then, the numbers of cracked grains and sound grains having no crack (except extraordinary grains) or the ratio between the numbers of cracked grains and sound grains is calculated and displayed on the display 17.

Figure 2A:
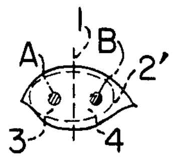
Figure 2B:
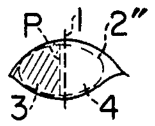
Figure 2C:
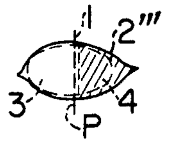

FIGS. 2*a*, 2*b* and 2*c* show rice grains placed on the light-transmitting window 1 and applied with the coherent light beam from the lower side. In these Figures, the central thick broken line represents the light-transmitting window 1, oval closed loop broken line represents the grain of in the hull and a thin vertical broken line appearing in the grain 2 represents the crack surface P. Symbols A and B represent respective points of views opposed to respective light-receiving elements 5 and 6. In the rice grain 2 shown in FIG. 2*a*, the quantities of light (brightness or darkness) received by both light-receiving elements 5, 6 through both side portions 3, 4 of the grain are equal to each other. Namely, in this case, the difference between quantities of light received by both light-receiving elements 5, 6 falls within the reference threshold value (voltage), so that this grain is recognized as a sound grain having no crack.

In the case of the rice grain 2″ shown in FIG. 2*b*, there is a cracking surface P at the left side of the light-transmitting window 1. Therefore, the coherent light beam coming into the rice grain 2″ through the light-transmitting window 1 is scattered by the cracking surface P and, in consequence, the quantity of light transmitted through the left side portion of the rice grain is decreased. In this case, therefore, there is a large difference between the quantities of light received by both light-receiving elements. As this difference comes out of the predetermined reference threshold, this rice grain is recognized as being a cracked rice grain.

In the rice grain 2‴ shown in FIG. 2*c*, the cracking surface is located in the right side portion of the grain so that a shadow (brightness or darkness) appears in a pattern contrary to that in the rice grain 2″ shown in FIG. 2*b*. This grain 2‴ is also recognized as a cracked grain because the difference of the quantity of light comes out of the reference threshold.

Figure 3:
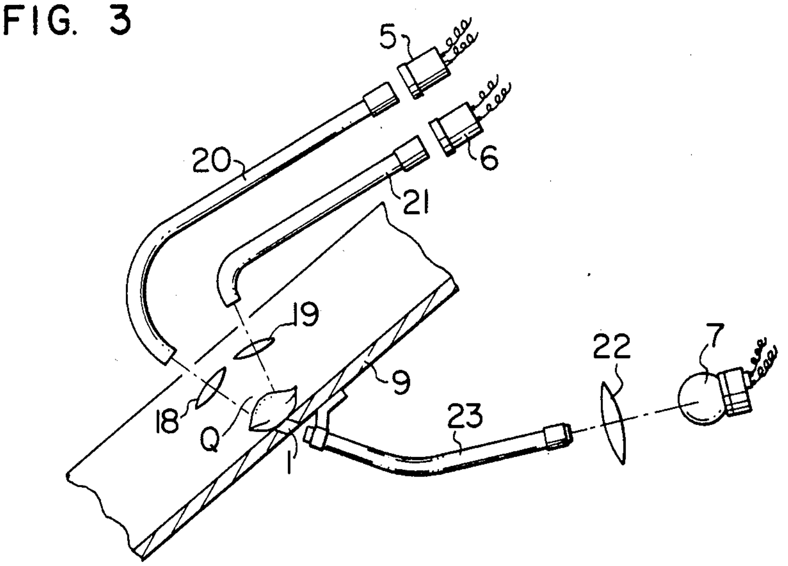
FIG. 3 is an illustration of a modification of a detecting section of the apparatus shown in FIG. 1.

FIG. 3 shows a modification of the apparatus shown in FIG. 1, in which lenses 18 and 19 are disposed in the detection section Q and glass fibers 20 and 21 are disposed such that their one ends oppose to the rice grain on the light-transmitting window through the lenses 18 and 19 while the other ends oppose to the light-receiving elements 5 and 6, respectively. Since the distance between both side portions of a rice grain is extremely small, it is very difficult to dispose two light-receiving elements in close proximity of the rice grain. This difficulty is overcome by the modification shown in FIG. 3 because, in this case, the light-receiving elements are optically connected to the rice grain through the glass fibers so that it is possible to stably mount the light-receiving elements at a sufficiently large distance from each other.

In the modification shown in FIG. 3, a glass fiber 23 is disposed such that its one end opposes to the light-transmitting window 1 with a small gap therebetween while the other end opposes to the light source 7 through a lens 22. If the light source 7 is disposed to oppose to the light-transmitting window 1 through the lens solely, it is necessary to preserve a sufficiently large gap between the light source 7 and the light-transmitting window 1, so that the overall height of the detecting device is increased undesirably. This problem, however, is completely overcome in this modification because the position of the light source can be selected freely due to the flexibility of the glass fiber through which the light is transmitted. It is thus possible to reduce the size of the apparatus as a whole.

In the embodiment shown in FIG. 1, since the light-transmitting window 1 is opened in the bottom of the flow-down conduit 15 which is mounted at an inclination, it is possible to continuously supply the rice grains to the light-transmitting window through the flow-down conduit 15, so that the detecting work can be conducted continuously to improve the efficiency of detection of the cracked rice grains.

Figure 4:
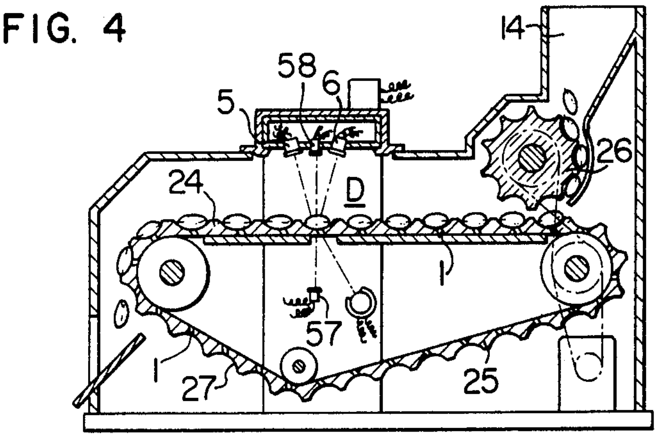
FIG. 4 is a vertical sectional view of an apparatus in accordance with another embodiment of the invention.

FIG. 4 shows an apparatus in accordance with a second embodiment of the invention in which a plurality of light-transmitting windows 1 are formed in the bottoms of recesses 27 formed in the surface 25 of an endless conveyor belt 24. The rice grains to be examined are supplied from the hopper 14 and are transferred one by one to the successive recesses 27, under the control of a rotary discharge valve 26. As the conveyor belt 24 runs, the rice grains are successively brought one by one to the light quantity detecting section D. In this embodiment, therefore, it is possible to throughly mechanize the work for arraying the rice grains and the work for moving the rice grains, so that these works are smoothed and hastened to further improve the efficiency of detection of cracked grains.

Figure 5:
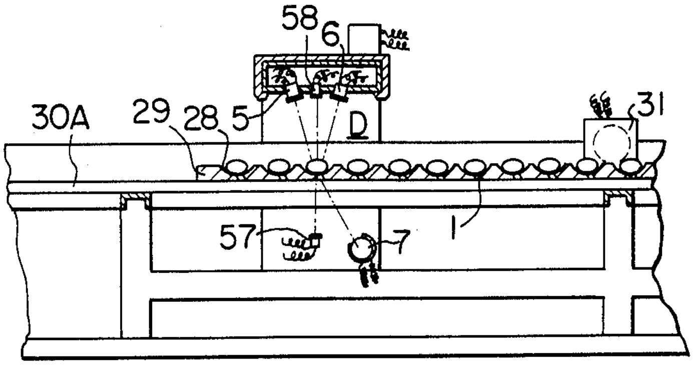
FIG. 5 is a sectional view of an essential part of the third embodiment.

FIG. 5 shows a third embodiment of the invention in which a moving plate 29 is disposed between the light-receiving elements 5, 6 and the light source 7. The moving plate is provided with a multiplicity of recesses 28 positioned to oppose to the light-receiving elements 5, 6 and arranged in rows. Each recess 28 is provided at its bottom with a light-transmitting window 1. The moving plate is adapted to be moved along rails 30A, 30B such that the successive rows of light-transmitting windows 1 are brought to a predetermined position where they oppose to the light-receiving elements 5 and 6. As a driving means 31 is started, the moving plate 29 is moved along the rails 30A, 30B so that the rice grains held on the light-transmitting windows are continuously and precisely brought to the above-mentioned predetermined position. In consequence, it is possible to enhance the efficiency of the detection of cracked rice grains and to achieve higher precision of detection.

In this case, the detecting device is constituted by the light source 7 and light-receiving elements 5, 6, as well as later-mentioned light-emitting diode 57 and a photosensor 58. The detecting device as a whole is adapted to scan the light-transmitting windows 1 which have reached the predetermined position, in the direction perpendicular to the longitudinal rows. Alternatively, a plurality of combinations of the light-receiving elements, corresponding in number to the number of longitudinal rows, are mounted stationarily.

Figure 7:
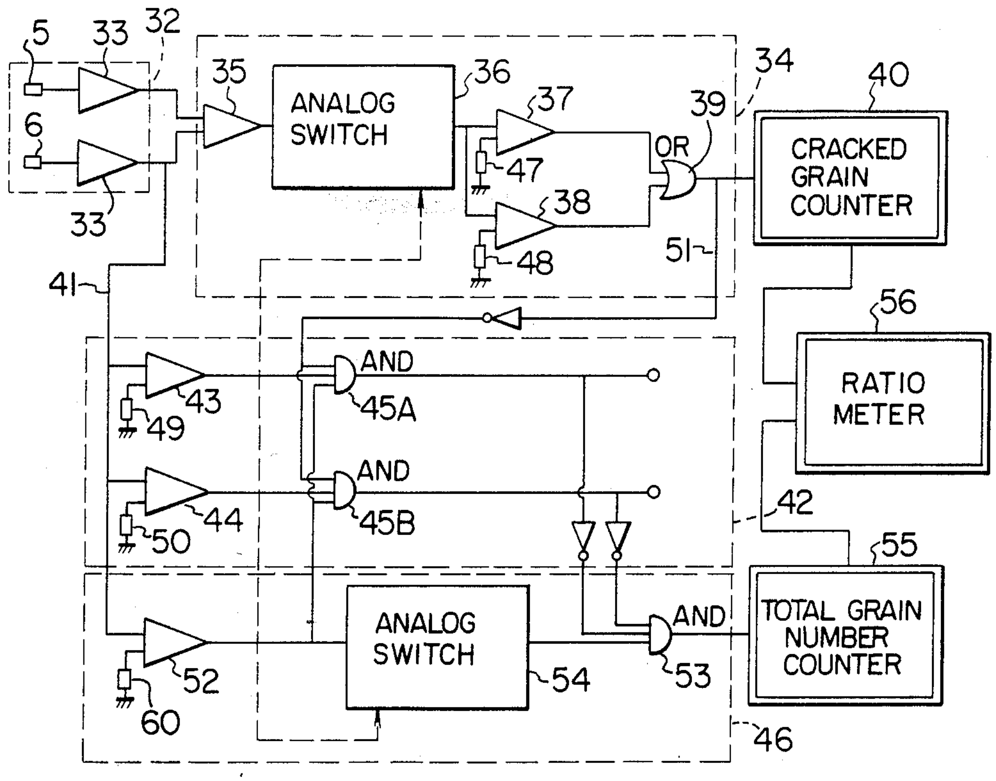
FIGS. 7 and 8 are circuit diagrams of electric circuits used in the apparatus shown in FIGS. 4 and 5.

An explanation will be made hereinunder as to the electric circuit shown in FIG. 7. Two light-receiving elements 5 and 6 provided in the cracked grain sensor 32 are electrically connected, through amplifiers 33, to a differential amplifier 35 of a cracked grain detection circuit 34. The output of the differential amplifier 35 is connected to a plurality of comparators 37 and 38, through an analog switch 36. The output side of the comparators are connected to a cracked grain counter 40 through an OR circuit 39. A shunt line 41 shunting from the output of the light-receiving element 6 is connected to comparators 43 and 44 of a grain sorting detection circuit 42, as well as to a comparator 52 of a total grain number detection circuit 46. The outputs of the comparators 43 and 44 are connected, through AND circuits 45A and 45B and inverters, to an AND circuit 53 in the total grain number detection circuit 46. Reference numerals 47 and 48 denote cracked grain setting device connected to the comparators 37 and 38 in the detection circuit 34. Reference numerals 49 and 50 denote grain sorting setting devices connected to the comparators 43 and 44 in the detectionn circuit 42. A shunt line 51 shunting from the output of the OR circuit 39 in the cracked grain detecting circuit 34 is connected through an inverter to AND circuits 45A and 45B provided in the grain sorting circuit. At the same time, a shunt line shunting from the output of the comparator 52 in the total grain number detection circuit 46 is connected to the AND circuits 45A and 45B, as well as to an analog switch 54, the output of which is connected through an AND circuit 53 to a total grain number counter 55. The counter circuits 40 and 55 are connected to a ratio meter 56.

Figure 6:
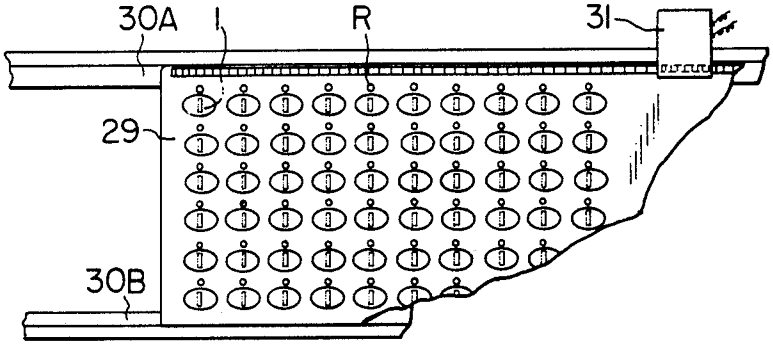
FIG. 6 is a plan view of a moving plate incorporated in the apparatus shown in FIG. 5.
Figure 8:
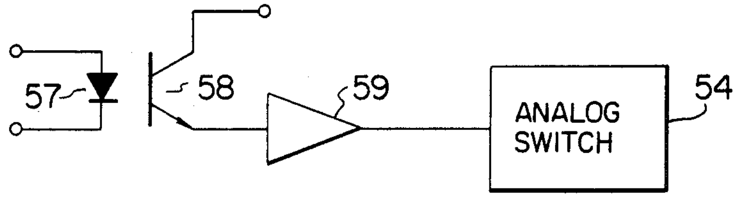

An electric circuit shown in FIG. 8 has a light-emitting diode 57 for applying light beam to the grain number counting holes R of the moving plate 29 shown in FIG. 6 and a photosensor 58 adapted to receive the light. The photosensor 58 is connected at its output side to the analog switch 54 through an amplifier 59. A reference numeral 60 denotes a grain number detection setting device connected to the comparator 52 of the detection circuit 46.

The light quantity detection signals from the light-receiving elements 5 and 6, corresponding to the brightness or darkness of the shadow of both portions 3 and 4 of the rice grain 2 on the light-transmitting window 1, are amplified and delivered to the cracked grain detecting circuit 34. The difference in the level of signals from both light-receiving elements 5 and 6 is sensed by the differential amplifier 35 in the cracked grain detection circuit 34, and the output from the amplifier 35 is delivered to the analog switch 36. On the other hand, the grain detection (confirmation) signal produced by the comparator 52 of the total grain number detection circuit 46 is delivered to the analog switch 54 which produces a switch signal for opening and closing the analog switch 36 at each time the detection (confirmation) signal is produced. The detection signal from the different amplifier 35 is delivered to the comparators 37 and 38 and are compared with the reference threshold values (plus or minus reference voltage) set by the setting devices 47 and 48 connected to the comparators 37 and 38. The signals representing the result of the comparison is inputted to the cracked grain counter circuit 40 through the OR circuit 39. The cracked grain counter circuit 40 then calculates the number of the cracked grains and puts the calculated number on display in the display 17.

The shunting output from the light-receiving element 6 is delivered to the comparators 43 and 44, of the grain sorting detection circuit 42 and are compared with reference light quantities corresponding to hulled grain and unripened grain which are set in the setting devices 49 and 59 connected to the comparators 43 and 44, respectively. The signals representing the results of the comparison are delivered to the AND circuits 45A and 45B. In the AND circuits 45A annd 45B, the hulled rice grains of high brightness (light quantity exceeding predetermined level) and unripened grains of high darkness (light quantity below predetermined level) are distinguished by the coincidence signal between the shunt output from the OR circuit 39 and the shunt output from the comparator 52 in the total grain number detection circuit 46. At the same time, the detection signals corresponding to the unripened and hulled grains are delivered to the AND circuit 53 provided in the detection circuit 46, so that the unripened rice grains and the hulled rice grains are excluded from the counting of the total grain number. The comparator 52 provided in the total grain number detection circuit 46 compares the output from the light-receiving element 6 with an input from a grain detection setting device 60 and delivers its output signal to the AND circuit 53 through an analog switch 54. In the AND circuit 53, the signal delivered from the comparator 52 is compared with the signals which are delivered from the AND circuits 45A and 45B of the grain sorting side through inverters. The coincidence signal obtained in the AND circuit 53 is delivered to the total grain number counter circuit 55 so that the total number of grains excepting the unripened and hulled rice grains is displayed on the display 17. The shunting outputs from the counter circuits 40 and 55 are delivered to the ratio meter 56 which calculates the ratio between the outputs from both counter circuits 40 and 55. The calculated ratio also is displayed on the display 17.

As has been described, according to the invention, it is possible to fully automatize the trouble-some and time-consuming work for detecting cracked grains thereby to save labour considerably. It is also possible to display the number of cracked grains or the ratio of cracked grains to the total number of grains in quite a short period of time. These effects in combination afford a mass-production of good grains through the highly accurate elimination of defective grains.

Although the invention has been described through specific reference to the unhulled rice, it will be clear to those skilled in the art that the invention is applicable to detection of cracked grains in other types of grains such as hulled rice grains, polished rice grains and so forth, by suitably changing and modifying the reference threshold values set in the comparators in the above-described circuit.

I claim:

1. An apparatus for detecting cracked rice grains, comprising:

path-defining means for defining a predetermined path having located thereon a detecting position adapted to detect rice grains passing successively one by one along said predetermined path;

light beam-directing means for directing a light beam to each of the rice grains successively passing along said predetermined path and over said detecting position so as to cause the light beam to be transmitted through the rice grain;

first and second light-sensing means for sensing light quantities transmitted respectively through the leading and trailing parts of each of the rice grains passed over said detecting position, to generate respectively first and second signals representative of the respective sensed light quantities;

cracked grain detection circuit means electrically connected to said first and second light-sensing means for receiving said first and second signal each time a rice grain passes over said detecting position for comparing the difference in light quantity between said first and second signals with a predetermined threshold value, such that when said difference in light quantity exceeds said predetermined threshold value a third signal is generated;

cracked grain counter means electrically connected to said cracked grain detection circuit means for successively receiving and counting the number of the third signals representative of the number of the cracked rice grains;

total grain number detection circuit means electrically connected to one of said first and second light-sensing means for generating a confirmation signal each time a rice grain passes over said detecting position; and total grain number counter means electrically connected to said total grain number detection circuit means for successively receiving the confirmation signals therefrom for counting the number of the confirmation signals representative of the total number of the rice grains passed over said detecting position.

2. The apparatus as defined in claim 1, further comprising:

ratio means electrically connected to said cracked rice grain counter means and to said total grain number counter means for indicating the ratio of the cracked rice grains to the total number of the detected rice grains.

3. The apparatus as defined in claim 2, wherein the rice grains to be detected are a mixture of desired rice grains and different rice grains, said predetermined threshold value being set such that said third signal is generated only when the cracked rice grain is a desired rice grain, said apparatus further comprising:

grain sorting detection circuit means electrically connected to one of the light-sensing means for receiving the signal therefrom each time a rice grain passes over said detecting position for comparing the signal from said one light-sensing means with at least one further predetermined threshold value such that, when the rice grain passing over said detecting position is a different rice grain, the signal from said one light-sensing means exceeds said further predetermined threshold value and a fourth signal is generated; and said total grain number detection circuit means successively receiving the fourth signals from said grain sorting detection circuit means, so as to deduct the number of the fourth signals from said number of confirmation signals.

4. The apparatus as defined in claim 3, wherein said path-defining means comprises an inclined chute having an upstream end, a downsteam end, a bottom wall extending between said upstream and downstream ends, and a light-admitting window formed in the bottom wall and located at said detecting position; and wherein said light beam-directing means comprises a light source means and said light-admitting window; said rice grains flowing down along said chute from said upstream end to said downstream end thereof and successively passing one by one over said light-admitting window.

5. The apparatus as defined in claim 3, wherein said path-defining means comprises a movable endless belt having a plurality of recesses, each adapted to receive a single rice grain, and a light-admitting window formed in the bottom of each of said recesses, said light-admitting windows successively passing one by one over said detecting position when said endless belt is moved; said light beam-directing means comprising light source means and the light-admitting window passing over said detecting position.

6. The apparatus as defined in claim 5, further comprising:

feed means for supplying the mixture of rice grains onto said endless belt so that the rice grains are receiving in said recesses.

7. The apparatus as defined in claim 3, wherein said path-defining means comprises a reciprocable plate member having a plurality of recesses each adapted to receive a single rice grain, and a light-admitting window formed in the bottom of each of said recesses, said recesses, said light-admitting windows successively passing one by one over said detecting position when said plate member is reciprocated; said light beam-directing means comprising light source mmeans and the light-admitting window passing over said detecting position.

8. The apparatus as defined in claims 4, 5, 6 or 7, wherein said light beam-directing means comprises a bundle of glass fibers disposed between said light source means and said detecting position and having one end facing said light source means and the other end facing said detecting position.

9. The apparatus as defined in claim 8, wherein each of said first and second light sensing means comprises a light sensing element and bundle of glass fibers having one end thereof facing said light sensing element and the other end facing said detecting position.

* * * * *

UNITED STATES PATENT AND TRADEMARK OFFICE
CERTIFICATE OF CORRECTION

PATENT NO. : 4,572,666

DATED : February 25, 1986

INVENTOR(S) : Toshihiko Satake

It is certified that error appears in the above-identified patent and that said Letters Patent is hereby corrected as shown below:

Column 7, line 9, change "signal" to --signals--;

Column 8, lines 37 and 38, after "said recesses," delete --said recesses,--; line 41, change "mmeans" to --means--;

Signed and Sealed this

*Fifth* Day of *August 1986*

[SEAL]

*Attest:*

DONALD J. QUIGG

*Attesting Officer* *Commissioner of Patents and Trademarks*